Jan. 5, 1954  E. HOSTETTLER  2,665,095
MUDGUARD INDICATOR FOR VEHICLES, PARTICULARLY AUTOMOBILES
Filed Feb. 26, 1952

INVENTOR:
Ernst Hostettler
By Bryant & Lowry
attys.

Patented Jan. 5, 1954

2,665,095

UNITED STATES PATENT OFFICE 2,665,095

MUDGUARD INDICATOR FOR VEHICLES, PARTICULARLY AUTOMOBILES

Ernst Hostettler, Zurich, Switzerland

Application February 26, 1952, Serial No. 273,466

2 Claims. (Cl. 248—43)

The known types of mudguard indicators for vehicles have between the stem and the foot, both of metal, a helical spring which serves as a flexible connection. With this construction, the costs of material and labour are still comparatively high. Moreover, mudguard indicators of this type may easily damage or interfere with the mudguards, because of the rigidity of their fixing parts, if an external pressure, e. g. a blow or a shock, acts on them.

It is the purpose of the present invention, to simplify the construction of the mudguard indicator, which, according to this invention, consists in making the foot and the flexible connection with the stem of one elastic body, in which the stem and the fixing means are anchored.

The drawing shows examples of constructions of the object of the present invention.

Figure 1:
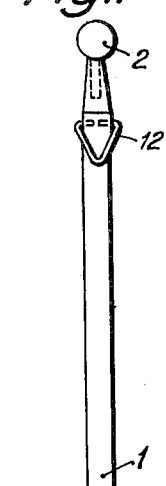
Fig. 1 is a view of the first construction of the mudguard indicator, with a partial section through the foot.
Figure 2:
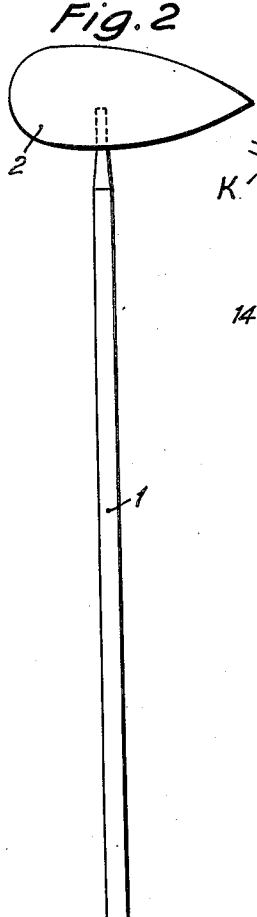
Fig. 2 shows the second construction of the mudguard indicator.

The first construction of the mudguard indicator comprises a rod 1, which has fixed to its top a round knob 2, strikingly coloured, made of synthetic resin. The lower end of the rod is screwed, and is anchored in the tapered portion 5 of a bell-shaped rubber base 4; it is screwed into a nut 3. 6 is a metal connecting piece, which strengthens the connection between the rod and the rubber base. The sole of the bell-shaped foot is concave and thus guarantees a good fit when it is fixed to the mudguard. In the bottom of the foot a fixing screw 8 with a hexagonal head 9 is anchored in an axial position. That part of the fixing screw 8 which projects from the foot is screwed and is provided with a nut 10 and a washer 11. 12 denotes attaching hooks, at the top and at the bottom of the rod, to fix a little flag.

The elasticity of the rubber foot enables the rod to swing out in all directions, so that fracture or bending of the mudguard indicator, when something knocks against it, is avoided.

The second construction of the mudguard indicator has a flat, streamlined body 2 instead of a round knob at the top of the rod. A pear-shaped block of rubber 4 serves as the foot; the lower part of the rod with an enlarged portion, e. g. a nut 3, is embedded in its tapered top 5. The metal connecting piece 6 strengthens the connection between the rod and the foot. The pear-shaped foot has a flat fitting face 7 at the side, which is intended to fit against the mudguard. Fixing screws 8 with hexagonal nuts 9 are embedded in the foot, so that their screwed portions project from the fitting face 7 and enable the foot to be fixed to the outside of the mudguard by means of nuts.

Figure 4:
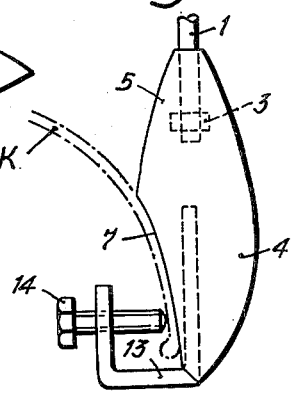
Fig. 4 shows a third construction of the mudguard indicator foot.
Figure 5:
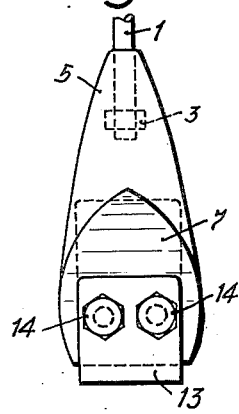
Fig. 5 is a side view to Fig. 4.
Figure 3:
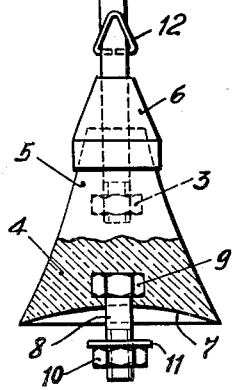
Fig. 3 is a side view of the mudguard indicator foot shown in Fig. 2.
Figure 3:
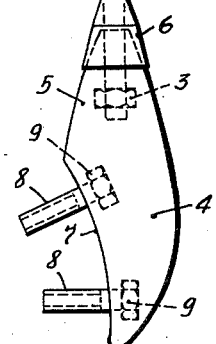
Figure 3:
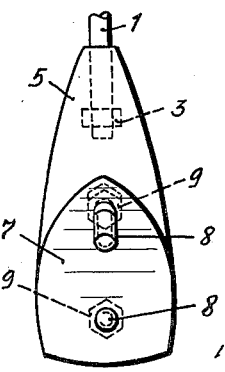

Figs. 4 and 5 show a construction of the mudguard indicator which enables it to be fixed to the edge of a mudguard K. For this purpose the pear-shaped rubber foot 4 with the fitting face 7 at the side is provided with a screw clamp 13, so that one leg of the clamp is embedded in the foot 4 and the other leg is furnished with a clamping screw 14. The clamping screw enables the mudguard indicator foot to be clamped to the edge of a mudguard, as shown in Fig. 4.

The mudguard indicator which is described here is particularly suitable for private cars, but obviously it can be used also for other vehicles.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A fender guide comprising a vertical rod, a vibration absorbing rubber body adapted for attachment to a fender with the lower end of the rod anchored in the upper end of the rubber body and terminating at its lower end above the transverse median line of said rubber body, the upper end of said rubber body being tapered with respect to its greatest diameter whereby the upper end of the rubber body and rod may vibrate in lateral directions without injury to said rod, a face of the rubber body below its upper end being curved incident to the curvature of the fender for intimate contact therewith and means embedded in the lower end of the rubber body below the lower end of the rod and extending outwardly of the rubber body for attaching the rubber body to the fender and presenting an intermediate freely flexible zone in the rubber body, the lower end of the rod and the fender-attaching means being on the vertical axis of said rubber body.

2. A fender guide as in claim 1, wherein the anchor means for the lower end of the rod includes a nut into which the lower end of the rod is threaded, the curved fender-engaging face being located at the bottom of the rubber body, the fender attaching means including a nut embedded in the rubber body adjacent the curved face and an attaching screw bolt threaded at one end into said nut.

ERNST HOSTETTLER.

References Cited in the file of this patent

UNITED STATES PATENTS

| Number | Name | Date |
|---|---|---|
| 667,630 | Kratz-Boussac | Feb. 5, 1901 |
| 735,415 | Schrodel | Aug. 13, 1903 |
| 2,121,317 | Cohen | June 21, 1938 |
| 2,121,525 | Johnson | June 21, 1938 |
| 2,153,896 | Mohar | Apr. 11, 1939 |
| 2,557,490 | Williams | June 19, 1951 |